PETER BURRESS, OF BRAIDWOOD, ILLINOIS.

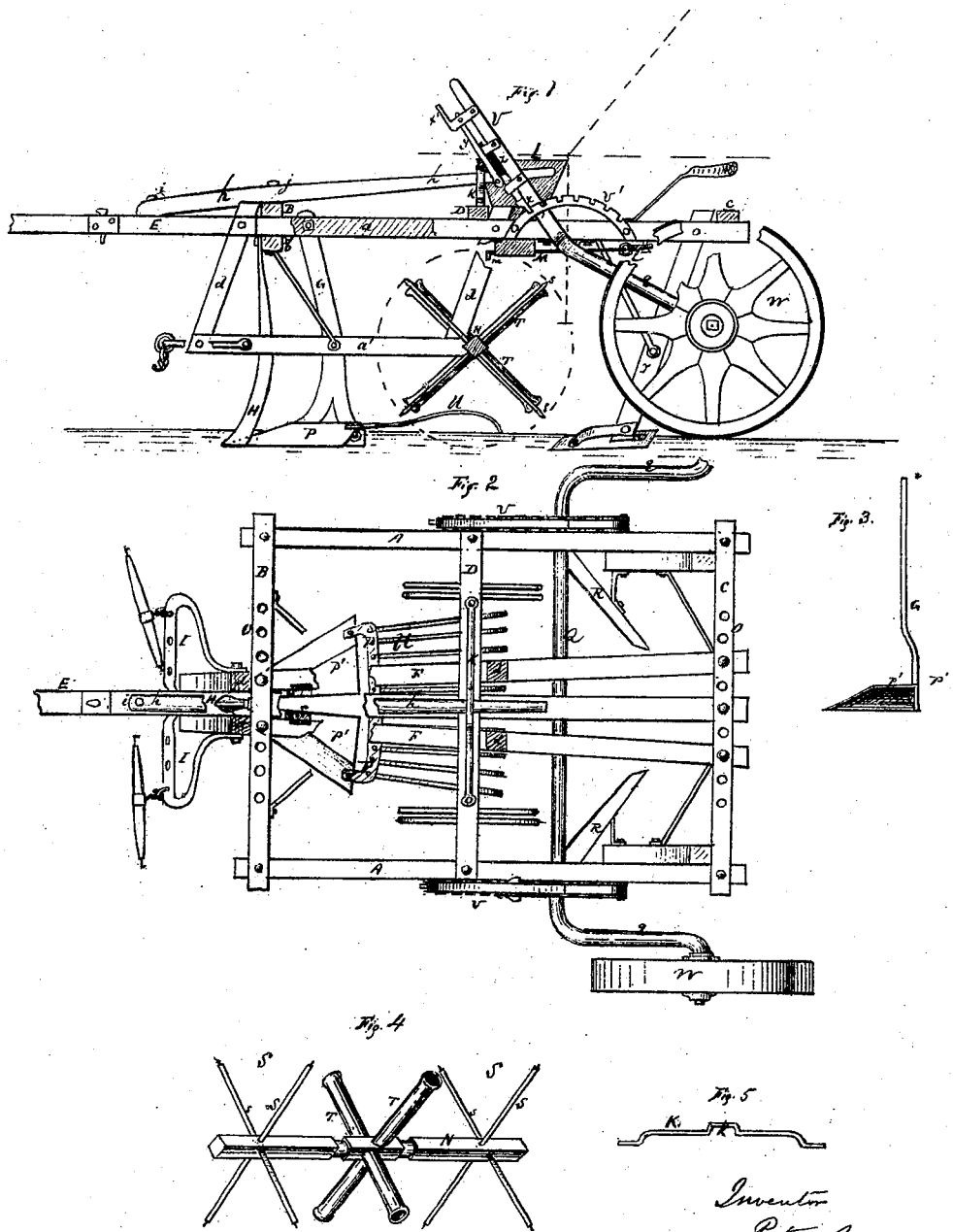
P. Burress,
Corn Planter
No. 110,736.　　　Patented Jan. 3, 1871.

Letters Patent No. 110,736, dated January 3, 1871.

IMPROVEMENT IN COMBINED CULTIVATORS AND PLANTERS.

The Schedule referred to in these Letters Patent and making part of the same.

*To all whom it may concern:*

Be it known that I, PETER BURRESS, of Braidwood, in the county of Will and State of Illinois, have invented certain new and useful Improvements in "Corn-Planter, Cultivator, Potato-digger, and Meadow-leveler Combined;" and I do hereby declare that the following is a full, clear, and exact description thereof, reference being had to the accompanying drawing making part of this specification, and to the letters of reference marked thereon, like letters indicating like parts wherever they occur.

To enable others skilled in the art to construct and use my invention, I will proceed to describe it.

Figure 1 represents the side elevation, and
Figure 2 the top view of the machine.

The nature of my invention consists in a device to operate the slides of the corn-boxes automatically, said device being so constructed as to drop the corn at equal distances and without a preliminary marking of the field.

It consists, also, in the combination of a colter with two plows or plow-shares, so shaped and set that, when a furrow is made for the corn to drop in, the soil on both sides of the said furrow is loosened, and the roots of the weeds are cut.

The invention consists, also, in so arranging the frame of the machine that, by changing the places of certain bolts, the pieces of the central frame to which the plows are affixed can be so spaced as to place the plows at a distance sufficient to take in the row of corn between them, and to cultivate the same by loosening the soil, scraping it toward the plants, and destroying the weeds on both sides of the said row.

It consists, also, in the axle of the machine so constructed and operated that the whole frame can be raised or lowered.

Also, in the mode of attaching to the machine the horses' tongue, and combining it with a lever to operate the same, both so arranged and connected that the driver is able to deviate the plows from the line, and thus follow the irregularities of the row of corn without damaging the plants.

The frame of the machine consists of two longitudinal pieces, A A, connected by cross-pieces B and C at the ends, and a cross-piece, D, about the middle.

Under the front cross-piece B another cross-piece, $b$, is placed, both B and $b$ being bolted to the pieces A A.

There is a movable or adjustable double frame placed in the middle of the above-described frame, and consisting of two separate and alike frames F F, each of which is made of an upper longitudinal piece, $a$, and the lower longitudinal piece $a'$, firmly connected by cross-pieces $d$ $d'$.

For planting corn the adjustable frames F F are bolted in front to the cross-pieces B $b$, close enough to place the points of the plows P P close together, while in the rear the pieces $a$ $a$ of the said frames F F are spread out wider, so as to keep the heels of the plows apart, and are bolted to the cross-piece C.

Several holes $o$ $o$ made in cross-pieces B $b$ and C are placed at equal distances from the center line of the machine, and their purpose is to bolt the frames F F further apart, setting them and the plows parallel to each other, and as far as desirable for the cultivation of corn, by passing on both sides of a row of plants with plows.

Plows P P consist of ordinary plow-shares, without the mold-boards, and the shares covered on the top with plates $p'$ $p'$, for the purpose of preventing dirt from filling said shares inside and allowing the weeds, potatoes, &c., to roll over.

Standards G G, secured to the land-sides of the plows, are bolted to the pieces $a$ $a'$ of the frames F F, and can be provided with several holes for the purpose of changing the places for bolts and of setting the plow deeper or shallower into the ground, and the pieces $a$ $a'$ of frames F F can also be provided with extra holes for changing places of the upper bolts and setting the plows horizontally or dipping.

Colter H is made of a triangular shape, pointed in front and wide in rear, made solid or hollowed out. It is so affixed to the frame as to have its point directly in front of the points of the plows P P.

E is a pole or tongue extending back to the rear cross-piece C, to which it is loosely pinned, and lying between the frames F F, passes between the cross-pieces B $b$ to the front of the machine and resting on the piece $b$.

Lever $h$, with its short arm, is pinned to the said tongue at $i$, and is fulcrumed at $j$ to the cross-piece B, and keeps the tongue in the central line of the machine when the end of its long arm is placed in the recess $k$ of the fixture K secured to the cross-piece D; but when this end of the lever is pressed down and shifted to the right or left, it shifts also the tongue E, which will cause the plows to deviate from the line, and thus will enable the driver when plowing corn to dodge the plants.

I I are the draw-irons to attach the horses to. They are secured to the front part of the frames F F, so as to be nearer to the point of resistance.

The dropping device consists of an ordinary corn-box, L, the movable plate M of which is provided with a projection or lip, $m$, and is connected with a coil or rubber spring, $l$, secured to the frame.

The box L is so affixed on the frame of the machine that the plate M can be operated by the conveying-tubes T T as they revolve.

To the shaft N, journaled to the rear part of the frames F F, the steppers S S and the grain-conveying tubes T T are firmly secured, and the journals are so arranged that the shaft N, with steppers and tubes, can easily be detached from or attached to the frame, if required.

Each stepper S consists of two iron rods, s s, secured to the shaft N at right angles to each other, making four arms or spokes long enough to go into the ground as deep as the plows go, or a trifle deeper.

Two tubes T T are affixed on the same shaft, between the steppers S S, at a right angle to each other also, forming four arms, but these arms are shorter than the arms of the steppers, and are made of such length as to come close enough to the bottom of the furrow made by the colter, but without striking the ground. The tubes are widened at the mouths, so as to easily receive the kernels, and the plane of their revolution is in the line with the colter H of the plows. Both the steppers and the tubes are affixed on the shaft N exactly alike, and their arms parallel to each other.

The operation of the above-described dropping device consists in this, that when the machine is set in operation the steppers' arms, entering the ground, revolve the shaft N and tubes T T, and they enter the ground always at equal distances, even if the ground is cloggy and uneven. When the upper end of one of the tubes T strikes at the lip m of the sliding plate M of the corn-box, it moves the plate so far as to bring its opening n opposite the opening of the kernel-cell, takes in the kernels which slide down through the said tube and drop into the furrow made by the colter H on the line with the ends of the arms of the steppers that are in the ground at the time. The sliding plate M is forced back into its former position by spring l, and the same operation as described above is repeated.

There are scrapers R R secured to standards r r, which follow the steppers and cover the dropped corn.

When plows P P and colter H, together with steppers and tubes, are affixed to the frame, then the machine is used for planting corn.

When the plows and colter are attached to the machine, but the steppers and tubes and the scrapers R are detached from the same, then the machine is used for leveling meadows, by cutting off the bogs or mole-hills and such like, as also for digging potatoes, in which case a wire rake, U, made in the shape of a paw, is attached to the rear part of the plows P P, and is dragged on the ground behind for the purpose of scattering the soil, which is loosened by the plows, and exposing the potatoes to be readily picked up.

But when the machine is to be used for plowing or cultivating corn, then the colter H and the shaft N, with steppers and tubes, are taken off, but the scrapers R are left on the machine, and the frames F F, with plows, are spread out as much as desirable, so as to take in a row of plants conveniently between the plows.

Q is an iron axle, journaled to the frame, and provided with arms q q, the ends of which are turned out and arranged for bearing the wheels W W.

V V are levers, secured to the axle Q, by operating which the wheels W W can be thrown forward or backward, thus raising or lowering the whole machine. When thrown forward the machine is raised off the ground, and is balanced on the said axle.

In order to keep the axle in position, a notched segment, V', is secured to the frame of the machine, and a sliding catch, x, connected with lever V and operated by handle x', pinned to the end of the said lever and connected with catch x by plate Y, is pressed down into one of the notches of the said segment V'.

Coil-spring Z or spring Z' presses catch x down and keeps it in place.

Having thus fully described my invention,

What I claim as new, and desire to secure by Letters Patent, is—

1. The covered plow-shares P P, with their colters H attached to the adjustable frames F F, all arranged to operate in combination with the main frame, substantially as described.

2. The arrangement, with the main frame, of the swinging tongue E, lever h, and rod K, all constructed and operating as set forth.

3. The rotating shaft N, provided with the seed-tubes T and rods S, in combination with the seed-slide, all arranged to operate substantially as described.

PETER BURRESS.

Witnesses:
 JOHN W. MERRILL,
 D. U. COBB.